US012792541B2

(12) United States Patent
Ushiro

(10) Patent No.: US 12,792,541 B2
(45) Date of Patent: Nov. 10, 2026

(54) VEHICLE-MOUNTED APPARATUS, VEHICLE-MOUNTED SYSTEM, CONTROL METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Shota Ushiro, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 41 days.

(21) Appl. No.: 18/853,609

(22) PCT Filed: Mar. 20, 2023

(86) PCT No.: PCT/JP2023/010788

§ 371 (c)(1),
(2) Date: Oct. 2, 2024

(87) PCT Pub. No.: WO2023/195328

PCT Pub. Date: Oct. 12, 2023

(65) Prior Publication Data

US 2025/0238384 A1 Jul. 24, 2025

(30) Foreign Application Priority Data

Apr. 4, 2022 (JP) ................................ 2022-062434

(51) Int. Cl.
*G06F 13/36* (2006.01)
*G06F 8/65* (2018.01)

(52) U.S. Cl.
CPC .......... *G06F 13/36* (2013.01); *G06F 2213/40* (2013.01)

(58) Field of Classification Search
CPC ........................ H04L 9/3239; H04L 12/40039
See application file for complete search history.

(56) References Cited

U.S. PATENT DOCUMENTS 11,285,916 B2 * 3/2022 Nakashima ............. B60R 25/34
2013/0326255 A1 * 12/2013 Kodama ........... H04L 12/40039 713/323

(Continued)

FOREIGN PATENT DOCUMENTS

JP 2014-000872 A 1/2014
JP 2019-186605 A 10/2019

(Continued)

OTHER PUBLICATIONS

AUTOSAR Layered Software Architecture; https://www.autosar.org/fileadmin/user_upload/standards/classic/4-3/AUTOSAR_EXP_LayeredSoftware Architecture.pdf p. 161-p. 165.

(Continued)

*Primary Examiner* — Getente A Yimer
(74) *Attorney, Agent, or Firm* — Brooks Kushman P.C.

(57) ABSTRACT

A vehicle-mounted apparatus distributes update data, which is provided from outside a vehicle, to a plurality of ECUs which are connected via a communication bus. Each of the plurality of ECUs belongs to at least one cluster out of a plurality of clusters. The vehicle-mounted apparatus includes a control unit which is operable to distribute setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster, and when distributing (Continued)

the first update data, the control unit distributes the control message, which disables the first cluster and enables the provisional cluster, to the plurality of ECUs.

12 Claims, 15 Drawing Sheets

(56) References Cited

U.S. PATENT DOCUMENTS

| | | | | |
|---|---|---|---|---|
| 2019/0227621 | A1* | 7/2019 | Washio | G06F 1/3287 |
| 2020/0114768 | A1* | 4/2020 | Oestreich | G01R 31/382 |
| 2021/0258186 | A1* | 8/2021 | Tokunaga | H04L 12/40039 |
| 2022/0012043 | A1* | 1/2022 | Sakurai | H04L 9/3239 |

FOREIGN PATENT DOCUMENTS

| | | | |
|---|---|---|---|
| JP | 2021-158650 | A | 10/2021 |
| JP | 2021-182679 | A | 11/2021 |

OTHER PUBLICATIONS

International Search Report, Application No. PCT/JP2023/010788, mailed Jun. 6, 2023. ISA/Japan Patent Office.

* cited by examiner

FIG. 4

T1

| | ECU | | | | |
|---|---|---|---|---|---|
| | 21 | 22 | 23 | 24 | 25 |
| C1 | 1 | 1 | 0 | 1 | 1 |
| C2 | 0 | 1 | 1 | 0 | 0 |
| C3 | 1 | 1 | 1 | 1 | 1 |
| ⋮ | ⋮ | ⋮ | ⋮ | ⋮ | ⋮ |
| C8 | 0 | 0 | 0 | 0 | 0 |

T2 T3

FIG. 5

| Data field | Cluster number |
|---|---|
| Bit 0 | C1 |
| Bit 1 | C2 |
| Bit 2 | C3 |
| ⋮ | ⋮ |
| Bit 7 | C8 |

FIG. 6

| | Data field F1 | | | | | | | |
|---|---|---|---|---|---|---|---|---|
| Bit | 0 | 1 | 2 | 3 | 4 | 5 | 6 | 7 |
| Control message | 1 | 0 | 0 | 0 | 0 | 0 | 0 | 0 |

FIG. 9

T1a

| | ECU | | | | |
|---|---|---|---|---|---|
| | 21 | 22 | 23 | 24 | 25 |
| C1 | 1 | 1 | 0 | 1 | 1 |
| C2 | 0 | 1 | 1 | 0 | 0 |
| C3 | 1 | 1 | 1 | 1 | 1 |
| ⋮ | ⋮ | ⋮ | ⋮ | ⋮ | ⋮ |
| C8 | 1 | 0 | 0 | 1 | 1 |

Provisional cluster (row C8)

T2a (column 21) T3a (column 22)

FIG. 11

| | Data field F2 | | | | | | | |
|---|---|---|---|---|---|---|---|---|
| Bit | 0 | 1 | 2 | 3 | 4 | 5 | 6 | 7 |
| Control message M1 | 0 | 0 | 0 | 0 | 0 | 0 | 0 | 1 |

VEHICLE-MOUNTED APPARATUS, VEHICLE-MOUNTED SYSTEM, CONTROL METHOD, AND COMPUTER PROGRAM

CROSS-REFERENCE TO RELATED APPLICATIONS

This application is the U.S. national stage of PCT/JP2023/010788 filed on Mar. 20, 2023, which claims priority of Japanese Patent Application No. JP 2022-062434 filed on Apr. 4, 2022, the contents of which are incorporated herein.

TECHNICAL FIELD

The present disclosure relates to a vehicle-mounted apparatus, a vehicle-mounted system, a control method, and a computer program.

BACKGROUND

Vehicle-mounted networks, in which a plurality of ECUs (Electronic Control Units) are connected, are well known. In recent years, the number of ECUs installed in a vehicle has increased, so to suppress power consumption by the system as a whole, a partial network function has been developed that wakes up only some of the ECUs, which are used for control, and keeps the other ECUs asleep. When such partial network function is used, there is a known technology that clusters groups of ECUs that work together to enable the ECUs to wake up smoothly.

AUTOSAR Layered Software Architecture, (online) retrieved from the following Internet URL on Mar. 2, 2022, https://www.autosar.org/fileadmin/user_upload/standards/classic/4-3/AUTOSAR_EXP_LayeredSoftwareArchitecture.pdf p. 161-p. 165 discloses a technology that uses network management messages (or "NM messages") to communicate requests and release information for partial network clusters (or "PNC") formed among ECUs.

JP 2021-182679A discloses a technology for forming a PNC between ECUs that transmit data frames between each other. As one example, a first PNC is formed between an air conditioner ECU and a meter ECU that displays the operating state of the air conditioner. Each ECU generates an NM frame that includes PNC information indicating which out of the plurality of PNCs is performing data frame communication and transmits the generated NM frame via a vehicle-mounted network to other ECUs.

JP 2014-872A discloses control apparatuses that belong to a first cluster and control apparatuses that belong to a second cluster. Each control apparatus transmits a network management frame, which includes sleep enable bits indicating whether each cluster is permitted to sleep, to other control apparatuses. When the sleep enable bit of the first cluster included in a network management frame is "1", control apparatuses belonging to the first cluster stop sleeping and enter an active state.

In a vehicle-mounted system that performs wake-up and sleep control of ECUs in cluster units, such as PNC, programs of the ECUs may be updated by update data distributed in cluster units. In such cases, when update data is distributed for a specific cluster, every ECU belonging to that specific cluster will wake up.

However, the specified cluster may include ECUs that are not to be updated by the update data. In other words, the update data may update only some of the ECUs belonging to the specified cluster. In this case, the ECUs that are not to be updated will be woken up unnecessarily, which may result in power being excessively consumed in the vehicle-mounted system when ECUs are updated.

In particular, ECU updates are often executed under circumstances where it is desirable to further suppress the power consumption of the vehicle battery, such as when the vehicle ignition is turned off. For this reason, it is necessary to suppress the power consumed by an ECU update.

In view of the problems described above, it is an object of the present disclosure to provide a vehicle-mounted apparatus, a vehicle-mounted system, a control method, and a computer program that can suppress the power consumed by an ECU update.

SUMMARY

A vehicle-mounted apparatus according to an aspect of the present disclosure distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, the vehicle-mounted apparatus including a control unit, wherein the control unit is operable to distribute, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster, and when distributing the first update data, the control unit distributes the control message, which disables the first cluster and enables the provisional cluster, to the plurality of ECUs.

A control method according to an aspect of the present disclosure controls a vehicle-mounted apparatus that distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, and the control method includes: a first step of distributing, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster; and a second step of distributing, when distributing the first update data, the control message, which disables the first cluster and enables the provisional cluster, to the plurality of ECUs.

A computer program according to an aspect of the present disclosure controls a vehicle-mounted apparatus that distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, and the computer program causes a computer to execute: a first step of distributing, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster; and a second step of distributing, when distributing the first update data, the control message, which disables the first cluster and enables the provisional cluster, to the plurality of ECUs.

Advantageous Effects

According to the present disclosure, it is possible to suppress the power consumed by an ECU update.

BRIEF DESCRIPTION OF DRAWINGS

FIG. 4 is a table indicating an example of cluster information according to the embodiment.

FIG. 5 depicts one example of how respective bits of a data field are associated with clusters.

FIG. 6 depicts one example of a control message according to the embodiment.

FIG. 9 is a table depicting one example of cluster information which includes a provisional cluster.

FIG. 11 depicts one example of a control message in which only a provisional cluster is enabled.

DETAILED DESCRIPTION OF PREFERRED EMBODIMENTS

Figure 1:
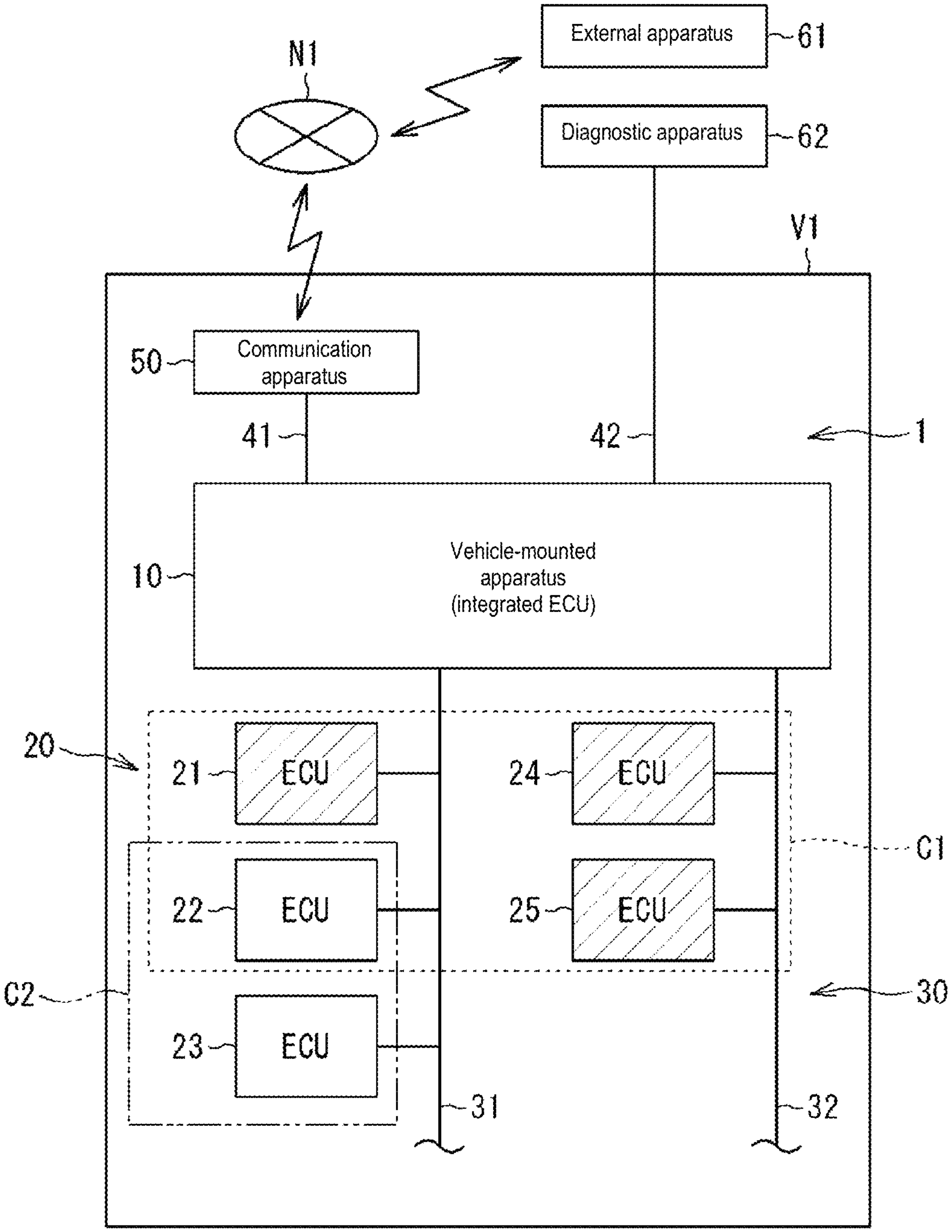
FIG. 1 depicts an example configuration of a vehicle-mounted system according to an embodiment.

Several embodiments of the present disclosure will first be listed and described in outline.

In a first aspect, a vehicle-mounted apparatus according to an aspect of the present disclosure distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, the vehicle-mounted apparatus including a control unit, wherein the control unit is operable to distribute, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster, and when distributing the first update data, the control unit distributes the control message, which disables the first cluster and enables the provisional cluster, to the plurality of ECUs.

By distributing a control message, which disables the first cluster and enables a provisional cluster, to a plurality of ECUs, it is possible to wake up only the updated ECUs and keep the non-updated ECUs in the sleep mode, which makes it possible to reduce the power consumed by updating the ECUs.

In a second aspect, the vehicle-mounted apparatus according to the first aspect may further include a storage unit configured to store cluster information linking each of the plurality of ECUs to the clusters to which the ECU belongs, wherein the control unit may determine, based on the cluster information and the first update data or update information provided from outside the vehicle before provision of the first update data, whether each of the plurality of ECUs belonging to the first cluster is an updated ECU or is a non-updated ECU.

By doing so, the control unit can determine whether each of the plurality of ECUs belonging to the first cluster is an updated ECU or a non-updated ECU.

In a third aspect, in the vehicle-mounted apparatus according to the first or the second aspects, before distribution of the first update data, the control unit may distribute discard information for discarding a setting of the provisional cluster to the plurality of ECUs belonging to the first cluster.

With this configuration, it is possible to dynamically set a provisional cluster from out of a limited number of clusters.

In a fourth aspect, in the vehicle-mounted apparatus according to any one of the first through the third aspects, when a new ECU belonging to the first cluster is to be added to the communication bus before distribution of the first update data, the control unit may acquire addition information, which is information relating to the new ECU, before the new ECU is added, and the control unit may distribute, before distribution of the first update data, the addition information to the plurality of ECUs belonging to the first cluster.

With this configuration, before the first update data is distributed, information relating to a new ECU can be transmitted in advance to the ECUs belonging to the first cluster. By doing so, non-updated ECUs that remain in sleep mode when the first update data is distributed can detect in advance that a new ECU will be added. This makes it possible to improve the reliability of the vehicle-mounted system.

In a fifth aspect, in the vehicle-mounted apparatus according to any one of the first through the fourth aspects, the control unit may distribute the setting information to the plurality of ECUs belonging to the first cluster in a state where the plurality of ECUs belonging to the first cluster have been set in the normal mode by the control message that enables the first cluster.

Even if an ECU that is a distribution destination is in the sleep mode, the control unit temporarily wakes up such destination ECU before distributing the setting information, which means that the setting information can be distributed to ECUs more reliably.

In a sixth aspect, in the vehicle-mounted apparatus according to any one of the first through the fifth aspects, when, after the updated ECUs have been updated by the first update data, a first non-updated ECU, which is the non-updated ECU that is connected to the same communication bus as the updated ECUs, has entered the normal mode, the control unit may notify the first non-updated ECU of an update content of the updated ECUs by the first update data.

By doing so, it is possible to prevent the update content of the updated ECUs from causing a malfunction in the operation of the first non-updated ECU.

In a seventh aspect, in the vehicle-mounted apparatus according to any one of the first through the sixth aspects, the plurality of ECUs may include a conflicted ECU which is switched to the normal mode by a first control message before the provisional cluster is set and is switched to the normal mode by a second control message that differs to the first control message without being switched to the normal mode by the first control message after the provisional cluster is set, and the control unit may transmit, when the control unit has received the first control message that is addressed to the conflicted ECU after the provisional cluster is set, the second control message to the conflicted ECU, transmit, in a state where the conflicted ECU has been set in the normal mode by the second control message, enable information, which makes a setting to enable the first control message to switch the conflicted ECU to the normal mode, to the conflicted ECU, and transmit the first control message to the conflicted ECU after transmitting the enable information.

By temporarily changing the cluster setting of a conflicted ECU that has stopped waking up due to a conflict over a virtual cluster, it is possible to execute specified control at the conflicted ECU. By doing so, it is possible to suppress the occurrence of malfunctions in the vehicle-mounted system, even in cases where the number of clusters is limited and a virtual cluster is set at a cluster that is already in use.

In an eighth aspect, in the vehicle-mounted apparatus according to the seventh aspect, after transmitting the enable information and the first control message to the conflicted ECU, the control unit may transmit, to the conflicted ECU, disable information, which makes a setting to prevent the conflicted ECU from being switched to the normal mode by the first control message.

In this way, by restoring the cluster setting of a conflicted ECU to its original state, the conflicted ECU can be kept in the sleep mode when the updated ECUs are updated with the first update data, thereby reducing power consumption in the vehicle-mounted system during updating.

In a ninth aspect, in the vehicle-mounted apparatus according to the seventh or the eighth aspect, the control message may include: a real-time message where a permitted period from reception of the control message by the control unit to execution of control based on the control message at the conflicted ECU is less than a first threshold; and a non-real-time message where the permitted period is equal to or greater than the first threshold, and the first control message may be a non-real-time message.

By using this configuration, it is possible to suppress the occurrence of a delay for control where the permitted period is short.

In a tenth aspect, a vehicle-mounted system according to an aspect of the present disclosure includes: the vehicle-mounted apparatus according to any one of the first through the ninth aspects; and the plurality of ECUs that are connected to the vehicle-mounted apparatus via the communication bus.

In an eleventh aspect, a control method according to an aspect of the present disclosure controls a vehicle-mounted apparatus that distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, and the control method includes: a first step of distributing, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster; and a second step of distributing, when distributing the first update data, the control message, which disables the first cluster and enables the provisional cluster, to the plurality of ECUs.

By distributing a control message, which disables the first cluster and enables a provisional cluster, to a plurality of ECUs, it is possible to wake up only the updated ECUs and keep the non-updated ECUs in the sleep mode, which makes it possible to reduce the power consumed by updating the ECUs.

In a twelfth aspect, a computer program according to an aspect of the present disclosure controls a vehicle-mounted apparatus that distributes update data, which is provided from outside a vehicle, to a plurality of ECUs which are connected via a communication bus, wherein each of the plurality of ECUs belongs to at least one cluster out of a plurality of clusters, and when a cluster to which an ECU belongs is disabled in a control message the ECU received from the communication bus, the ECU enters a sleep mode in which functions are more limited than in a normal mode to suppress power consumption, but when the cluster to which the ECU belongs is enabled, the ECU enters the normal mode, and the computer program causes a computer to execute: a first step of distributing, before distribution of first update data, which is the update data for a first cluster out of the plurality of clusters, setting information for setting a provisional cluster, which includes updated ECUs that are ECUs out of the plurality of ECUs belonging to the first cluster that are to be updated by the first update data but does not include non-updated ECUs that are not to be updated by the first update data, to the plurality of ECUs belonging to the first cluster; and a second step of distributing, when distributing the first update data, the control message, which disables the first cluster and enables the provisional cluster, to the plurality of ECUs.

By distributing a control message, which disables the first cluster and enables a provisional cluster, to a plurality of ECUs, it is possible to wake up only the updated ECUs and keep the non-updated ECUs in the sleep mode, which makes it possible to reduce the power consumed by updating the ECUs.

Several embodiments of the present disclosure will now be described in detail with reference to the attached drawings.

Configuration of Vehicle-Mounted System

FIG. 1 depicts an example configuration of a vehicle-mounted system 1 according to an embodiment.

This vehicle-mounted system 1 is a system mounted in a vehicle V1, such as an automobile. The vehicle-mounted system 1 includes a vehicle-mounted apparatus 10, a plurality of ECUs 20, a communication bus 30, communication lines 41 and 42, and a communication apparatus 50.

As one example, the vehicle-mounted apparatus 10 functions as an integrated ECU (Electronic Control Unit) that manages a plurality of ECUs 20. As an example configuration, the vehicle-mounted apparatus 10 functions as a master ECU, and the plurality of ECUs 20 function as slave ECUs. The vehicle-mounted apparatus 10 distributes update data provided from outside the vehicle V1 (in more detail, from an external apparatus 61, a diagnostic apparatus 62, or a recording medium 17) to the plurality of ECUs 20.

The vehicle-mounted apparatus 10 may function as a GW-ECU (Gateway-ECU) that relays data transmitted and received between the plurality of ECUs 20. As one example, for a network environment where a plurality of different LANs (Local Area Networks) are installed in the vehicle V1, the vehicle-mounted apparatus 10 may relay data transmitted and received by the plurality of ECUs 20 on the respective LANs, and as a specific example may be a central gateway (CGW). The internal configuration of the vehicle-mounted apparatus 10 will be described later.

The communication apparatus 50 is a communication interface that performs wireless communication with the external apparatus 61 via a network N1, such as the Internet. In more detail, the communication apparatus 50 is a TCU (Telematics Communication Unit). The communication apparatus 50 transmits data outputted from the vehicle-mounted apparatus 10 via the communication line 41 via the network N1 to the external apparatus 61. The communication apparatus 50 also inputs data (such as update data or update information Y1), which has been transmitted via the network N1 from the external apparatus 61, via the communication line 41 to the vehicle-mounted apparatus 10.

The external apparatus 61 is an apparatus installed outside the vehicle V1. As one example, the external apparatus 61 is a server including a control unit, a storage unit, and a communication unit. The storage unit of the external apparatus 61 stores, for example, a program or data for controlling the components (as examples, the vehicle-mounted apparatus 10 or the ECUs 20) of the vehicle-mounted system 1. As one example, the manufacturer of an ECU 20 may modify the program or data as necessary and store the modified program or data in a storage unit of the external apparatus 61 as required. A communication unit of the external apparatus 61 transmits this modified program or data to the vehicle-mounted apparatus 10 as update data. For this reason, the external apparatus 61 is also referred to as an "OTA (Over The Air) server".

Before transmitting the update data to the vehicle-mounted apparatus 10, the external apparatus 61 may transmit update information Y1, which includes information for identifying the ECU to be updated by the update data (such as an address of the ECU), to the vehicle-mounted apparatus 10.

The update data may be a program (or "application program") for updating the software of an ECU 20, or a program (or "firmware program") for updating the firmware of the ECU 20. The update data may also be data for updating parameter information stored in an ECU 20. Parameter information is data used by software implemented at an ECU 20, and as specific examples may include map information and control parameters.

The diagnostic apparatus 62 (also referred to as a "diagnostic tool") is an apparatus used by a vehicle maintenance provider (such as a dealer) who maintains the vehicle V1. As one example, the diagnostic apparatus 62 is a general-purpose information terminal such as a personal computer, a tablet, or a smartphone on which an application that diagnoses the status of each component (such as an ECU 20) of the vehicle-mounted system 1 is installed. The diagnostic apparatus 62 may also be a dedicated terminal on which the application is installed.

The diagnostic apparatus 62 includes a control unit, a storage unit, and a communication unit. When maintenance work or the like is performed on the vehicle-mounted system 1 using the diagnostic apparatus 62, a communication unit of the diagnostic apparatus 62 is connected via the communication line 42 to the vehicle-mounted apparatus 10. The communication unit of the diagnostic apparatus 62 communicates via the network N1 with the external apparatus 61 according to a wireless communication standard, such as Wi-Fi. The diagnostic apparatus 62 downloads update data via the network N1 from the external apparatus 61. The diagnostic apparatus 62 transmits the update data via the communication line 42 to the vehicle-mounted apparatus 10.

The communication bus 30 extends from the vehicle-mounted apparatus 10. The plurality of ECUs 20 are each connected to this communication bus 30. Although two communication buses 30 extend from the vehicle-mounted apparatus 10 in the example in FIG. 1, there is no particular limit on the number of communication buses 30. When distinguishing between these two communication buses 30, the buses will be referred to as "communication bus 31" and "communication bus 32", respectively. The communication buses 30 comply with a communication protocol, such as CAN (Controller Area Network), CAN-FD (CAN with Flexible Data Rate), Ethernet (registered trademark), LIN (Local Interconnect Network), CXPI (Clock Extension Peripheral Interface), or FlexRay (registered trademark).

The vehicle-mounted apparatus 10 is connected to a plurality of (in the example in FIG. 1, five) ECUs 20 via the communication buses 30. In the example in FIG. 1, the vehicle-mounted apparatus 10 is connected to three ECUs 20 via the communication bus 31 and to two ECUs 20 via the communication bus 32. When distinguishing between the plurality of ECUs 20, the ECUs 20 connected to the communication bus 31 will be referred to as "ECU 21", "ECU 22", and "ECU 23" in order from the top, and the ECUs 20 connected to the communication bus 32 will be referred to as "ECU 24" and "ECU 25" in order from the top.

So long as the number is two or higher, there is no particular limit on the number of ECUs 20 included in the vehicle-mounted system 1. As examples, the ECUs 20 are apparatuses (or "operation-type ECUs") that control various parts of the vehicle V1 (as examples, the braking apparatus, doors, battery, and air conditioner. There are no particular limitations on the functions of the ECUs 20, and the ECUs 20 may be apparatuses (or "detector-type ECUs") that communicate with sensors and monitor the states of respective parts of the vehicle V1. The plurality of ECUs 20 may have respectively different functions or may have the same functions.

The plurality of ECUs 20 are compatible with a partial network function and each belong to at least one out of a plurality of clusters. Here, a cluster is a data set, such as a partial network cluster (PNC), that defines a group of ECUs, out of the plurality of ECUs 20, that synchronously execute at least one of waking-up and sleeping. Specific examples of clusters set in the vehicle-mounted system 1 will be described later.

Internal Configuration of Vehicle-Mounted Apparatus 10

Figure 2:
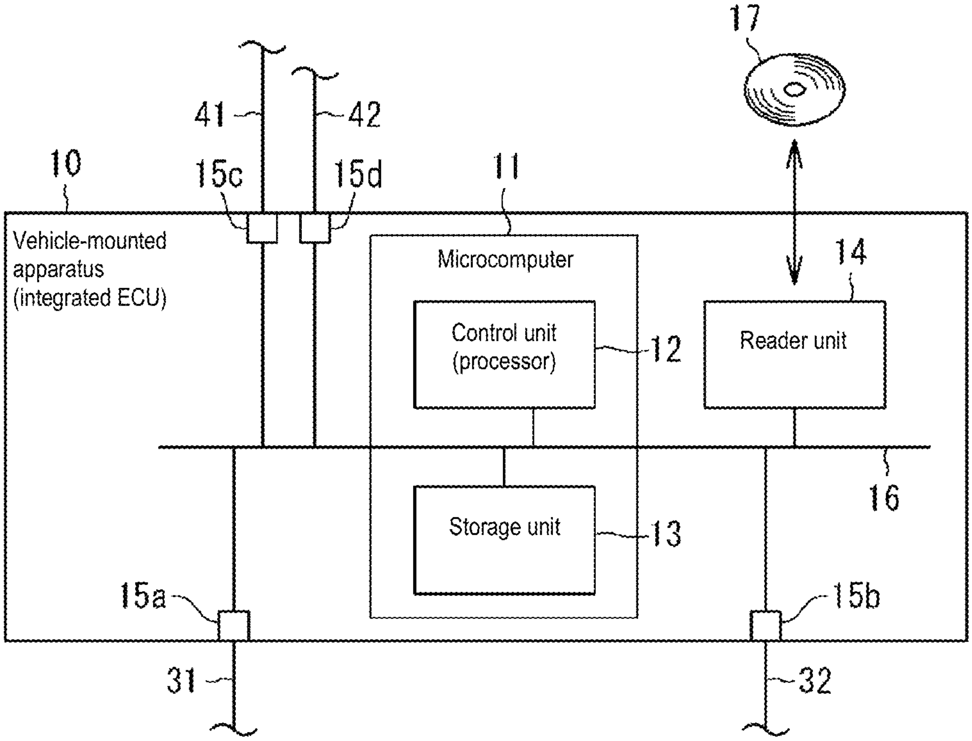
FIG. 2 depicts one example of the internal configuration of a vehicle-mounted apparatus according to the embodiment.

FIG. 2 depicts one example of the internal configuration of the vehicle-mounted apparatus 10.

The vehicle-mounted apparatus 10 includes a microcontroller unit 11 (hereinafter referred to as the "microcomputer 11") including a control unit 12 and a storage unit 13, a reader unit 14, and a plurality of transceivers 15*a* to 15*d*. These components are electrically connected by a bus 16.

The control unit 12 includes a circuit configuration (or "circuitry") including a processor and the like. In more detail, the control unit 12 includes one or more CPUs (Central Processing Units). The processors included in the control unit 12 may be GPUs (Graphics Processing Units). The control unit 12 reads out a computer program stored in the storage unit 13 and executes various computations and control.

The control unit 12 may include a processor in which a predetermined program has been written in advance. As examples, the control unit 12 may be an integrated circuit such as a CPLD (Complex Programmable Logic Device), an FPGA (Field-Programmable Gate Array), or an ASIC (Application Specific Integrated Circuit). In this case, the control unit 12 executes various computations and control based on a program written in advance.

The storage unit 13 includes a volatile memory and a non-volatile memory, and stores various data. Volatile memory includes RAM (Random Access Memory), for example. As examples, nonvolatile memory includes flash memory, an HDD (Hard Disk Drive), an SSD (Solid State Drive), or ROM (Read Only Memory). Part of this nonvolatile memory may be provided outside the microcomputer 11.

As one example, the storage unit 13 stores a computer program, the cluster information described later, and various parameters in a nonvolatile memory. The storage unit 13 may store a computer program that has been downloaded from the external apparatus 61 via the network N1 and the communication apparatus 50.

The reader unit 14 reads information from a computer-readable recording medium 17. As examples, the recording medium 17 is an optical disc, such as a CD or DVD, an SD memory card, or a USB flash memory. As examples, the reader unit 14 is an optical drive, a memory card slot, or a USB terminal. Acomputer program, update data, and various parameters are recorded on the recording medium 17, and by having the reader unit 14 read the recording medium 17, the computer program, update data, and various parameters are stored in the nonvolatile memory of the storage unit 13.

The transceivers 15*a* to 15*d* receive signals that flow on the communication buses 30 or the communication lines 41 and 42 via the respective ports (not illustrated) and convert such signals into signals that can be read by the microcomputer 11. The transceiver 15*a* is connected to the communication bus 31, the transceiver 15*b* is connected to the communication bus 32, the transceiver 15*c* is connected to the communication line 41, and the transceiver 15*d* is connected to the communication line 42.

Internal Configuration of ECU 20

Figure 3:
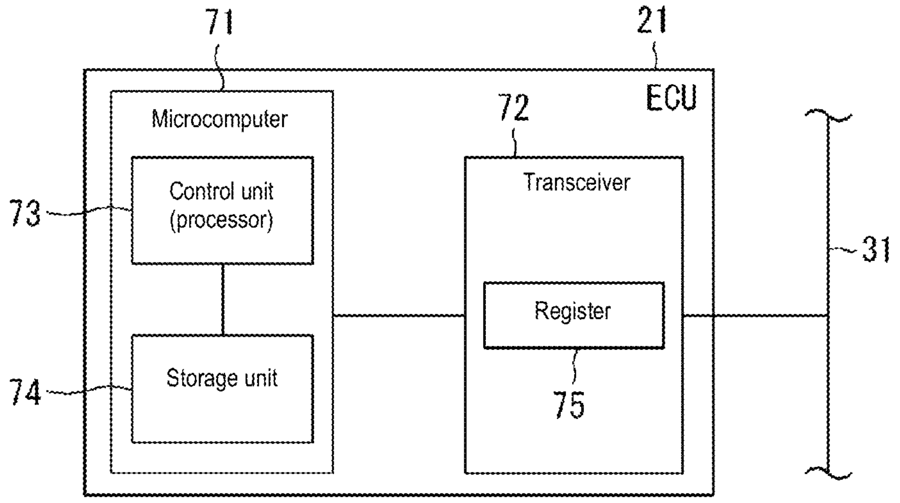
FIG. 3 depicts one example of the internal configuration of an ECU according to the embodiment.

FIG. 3 depicts one example of the internal configuration of the ECU 21. Since the internal configuration of the other ECUs 20 is the same as the ECU 21, description is omitted here.

The ECU 21 includes a microcontroller unit 71 (hereinafter referred to as the "microcomputer 71"), which includes a control unit 73 and a storage unit 74, and a transceiver 72, which includes a register 75. The transceiver 72 is electrically connected to the microcomputer 71. The ECU 21 further includes a power supply circuit (not illustrated) that converts power supplied from a power source (not illustrated) and supplies the converted power to these units 71 and 72.

In the same way as the control unit 12, the control unit 73 includes a circuit configuration (or "circuitry") including a processor and the like. As one example, the control unit 73 reads out a computer program stored in the storage unit 74 and executes various computations and control. In the same way as the control unit 12, the control unit 73 may include a processor in which a predetermined program has been written in advance. In this case, the control unit 73 executes various computations and control based on the program written in advance.

In the same way as the storage unit 13, the storage unit 74 includes a volatile memory and a nonvolatile memory and stores various data. As one example, the storage unit 74 stores computer programs and various parameters in the nonvolatile memory.

The transceiver 72 is a transceiver that supports a partial network function and includes an integrated circuit (IC). As examples, the transceiver 72 is a CAN transceiver or an SBC (System Basis Chip). The transceiver 72 is connected to the communication bus 31 and receives various control messages from the communication bus 31.

The transceiver 72 includes a transmission circuit, a reception circuit, and a detection circuit (none of which are illustrated). The transmission circuit and the reception circuit communicate in accordance with the same communication protocol as the communication bus 31. The transmission circuit converts a digital signal data outputted by the microcomputer 71 into a three-level analog signal and sends the signal to the communication bus 31. This analog signal data is broadcast to the communication bus 31. The reception circuit converts an analog signal inputted from the communication bus 31 into a digital signal that is readable by the microcomputer 71, and outputs this digital signal to the microcomputer 71.

The detection circuit includes a function of determining whether a control message received from the communication bus 31 is a control message addressed to the ECU 21. When the detection circuit has determined that the received control message is a control message addressed to the ECU 21, the detection circuit switches the ECU 21 from a sleep mode to a normal mode.

In more detail, when the transceiver 72 has received a control message that matches cluster information T2 (described later) recorded in the register 75, the transceiver 72 switches the ECU 21 from the sleep mode to the normal mode (that is, the transceiver 72 wakes up the ECU 21).

Partial Networking in the Vehicle-Mounted System 1

To suppress the power consumption in the vehicle-mounted system 1 as a whole, the vehicle-mounted system 1 uses a network management function to wake up only some of the ECUs 20 used for control while keeping the other ECUs 20 asleep. Each ECU 20 is capable of switching between the normal mode and the sleep mode. This mode switching is fundamentally executed based on control messages broadcast on the communication buses 30. Such control messages are also referred to as "network management frames (NM frames)".

The normal mode is a mode where the ECU 20 has woken up and functions of the ECU 20 that are necessary for various types of control are available. As one example, the normal mode is a state where a clock circuit of a processor included in the ECU 20 operates at a predetermined clock speed that is set in advance.

Sleep mode is a mode in which the functions of the ECU 20 are more limited than in normal mode to suppress power consumption. As one example, sleep mode is a state where the supplying of power to the clock circuit of the processor included in the ECU 20 is stopped, which stops the operation of the clock circuit and operation of the processor. Note that although sleep mode may be a state where power is supplied to the clock circuit of the processor included in the ECU 20, power consumption may be suppressed by operating the clock circuit at a clock frequency that is lower than the clock frequency in normal mode.

As examples, when the ECU 20 has remained continuously unused for a predetermined period or when predetermined control has been executed, the ECU 20 automatically switches from the normal mode to the sleep mode. The supplying of power from the power supply circuit of the ECU 20 to the detection circuit of the transceiver 72 continues even when the ECU 20 is in the sleep mode. This enables the transceiver 72 to detect control messages in the sleep mode.

A control message for switching an ECU 20 from the sleep mode to the normal mode is generated, for example, at the vehicle-mounted apparatus 10 or at another ECU 20 and is broadcast to the communication bus 30. This control message includes an information pattern indicating the cluster(s) to be woken up, with the ECUs 20 waking up based on this control message in groups of the clusters to which the ECUs 20 belong.

Clusters will now be described. The plurality of ECUs 20 each belong to at least one cluster. The storage unit 13 of the vehicle-mounted apparatus 10 stores cluster information T1 that links the plurality of ECUs 20 with the clusters to which the ECUs 20 belong.

FIG. 4 is a table indicating an example of cluster information T1. This cluster information T1 indicates which ECUs 20 belong to eight clusters C1 to C8. Note that the number of clusters in FIG. 4 is one example, and nine or more clusters may be provided. In the table, "1" indicates that an ECU 20 belongs to the cluster in that row, and "0" indicates that the ECU 20 does not belong to the cluster in that row.

As one example, as depicted in FIG. 1, the ECUs 21, 22, 24, and 25 belong to the cluster C1. The ECUs 22 and 23 belong to the cluster C2. The ECUs 21 to 25 belong to the cluster C3. In this way, one ECU 20 may belong to a plurality of clusters. None of the ECUs 21 to 25 belong to the cluster C8, making it a so-called "empty" cluster. In the following description, "waking up the ECUs 21, 22, 24, and 25 belonging to the cluster C1" will also be expressed simply as "waking up the cluster C1". Similar expressions are also used for the other clusters C2 to C8.

Next, a control message for waking up each cluster of the ECUs 20 will be described. Each control message includes a data field F1 indicating the clusters to be woken up out of the plurality of clusters C1 to C8.

FIG. 5 depicts one example of how the respective bits of the data field F1 are associated with the clusters C1 to C8. The data field F1 is composed of 8 bits, for example, with the respective bits being assigned to the clusters C to C8. As one example, the cluster C1 is assigned to the first bit (Bit 0).

FIG. 6 depicts one example of a data field F1 included in a control message. The ECUs 20 that have received this control message wake up if they belong to a cluster corresponding to a bit set at "1" in the data field F1. As one example, in the data field F1 in FIG. 6, Bit 0 is set at "1" and Bits 1 to 7 are set at "0". This means that as depicted in FIG. 5, out of the ECUs 20 that have received the control message including the data field F1, only the ECUs 21, 22, 24, and 25 that belong to the cluster C1 wake up.

In the following description, in the data field F1 of the control message, setting a bit at "1" is referred to as appropriate as "enabling" the cluster corresponding to that bit, and setting a bit at "0" will be referred to as appropriate as "disabling" the cluster corresponding to that bit.

Each ECU 20 stores cluster information T2 in the register 75. The cluster information T2 is information indicating the clusters to which this ECU 20 belongs. As one example, in the case of the ECU 21, the information in the first column (the column which indicates the clusters to which ECU 21 belongs) of the cluster information T1 depicted in FIG. 4 is stored in the register 75 as the cluster information T2. In the case of the ECU 22, the information in the second column of the cluster information T1 is stored in the register 75 as cluster information T3.

When the transceiver 72 of an ECU 20 has received a control message including the data field F1 via the communication bus 30, the transceiver 72 determines whether the cluster information T2 stored in the register 75 of that ECU 20 matches the data field F1. In more detail, the transceiver 72 calculates the product of a bit in the cluster information T2 and a corresponding bit in the data field F1 for each bit. If any of the bits is "1" after the calculation, it is determined that the cluster information T2 and the data field F1 "match", and the ECU 20 is woken up.

In the examples in FIGS. 4 to 6, the cluster information T2 has an 8-bit pattern of "101 . . . 0", and the data field F1 has an 8-bit pattern of "100 . . . 0". From FIG. 5, the nth bit of the cluster information T2 corresponds to the nth bit of the data field F1. Since the product of the 1st bit of the cluster information T2 and the 1st bit of the data field F1 is "1", the ECU 21 wakes up.

Problem to be Solved by the Present Embodiment

In the vehicle-mounted system 1, update data for updating the program of the ECU 20 is provided to the vehicle-mounted apparatus 10 from outside the vehicle V1, such as from the external apparatus 61, the diagnostic apparatus 62, or the recording medium 17. In the vehicle-mounted system 1, since the wake-up and sleep states of the plurality of ECUs 20 are controlled in units of clusters, the update data is also provided to the vehicle-mounted apparatus 10 in cluster units.

In a conventional configuration, the vehicle-mounted apparatus 10 updates the ECUs 20 in cluster units by distributing update data in cluster units, which has been provided from outside the vehicle V1, to the plurality of ECUs 20 without amendment. As one example, when the vehicle-mounted apparatus 10 has received update data for the cluster C1 from the outside, the vehicle-mounted apparatus 10 wakes up all of the ECUs 21, 22, 24, and 25 that belong to the cluster C1 by distributing the update data together with a control message including the data field F1 depicted in FIG. 6.

However, the cluster C1 may include an ECU 20 that is not updated by the update data. In the example in FIG. 1, the shaded ECUs 21, 24, and 25 are ECUs to be updated with the update data (that is, "updated ECUs 21, 24, and 25"), and the unshaded ECU 22 is an ECU that is not to be updated with the update data (that is, a "non-updated ECU 22"). In this case, since waking up the cluster C1 will also unnecessarily wake up the non-updated ECU 22, this may result in power being excessively consumed in the vehicle-mounted system 1.

In particular, updating of the ECUs 20 is often performed in situations where it is desirable to further reduce the power consumption of the battery of the vehicle V1, such as when the ignition of the vehicle V1 is turned off. For this reason, it is necessary to suppress the power consumption required for updating the ECUs 20.

In the present embodiment, before to distribution of the update data that is targeted at the cluster C1 (this data is hereinafter referred to as the "first update data D1"), the vehicle-mounted apparatus 10 distributes setting information Y2, which sets a provisional cluster to which the updated ECUs 21, 24, 25 that are to be updated by the first update data D1 belong and to which the nonupdated ECU 22 that is not updated by the first update data D1 does not belong, to the plurality of ECUs 21, 22, 24, and 25 that belong to the cluster C1.

After setting a provisional cluster at each of the ECUs 21, 22, 24, and 25, the vehicle-mounted apparatus 10 distributes a control message M1, which disables the cluster C1 and enables the provisional cluster, to the plurality of ECUs 20 when distributing the first update data D1. By doing so, it is possible, in a state where the nonupdated ECU 22 is left asleep, to wake up only the updated ECUs 21, 24, and 25 during updating, which suppresses the power consumption required for updating the ECUs 20.

Hereinafter, specific examples of the content of control in the vehicle-mounted system 1 will be described using an example where the ECUs 20 are updated by the first update data D1.

Control Method

Figure 7:
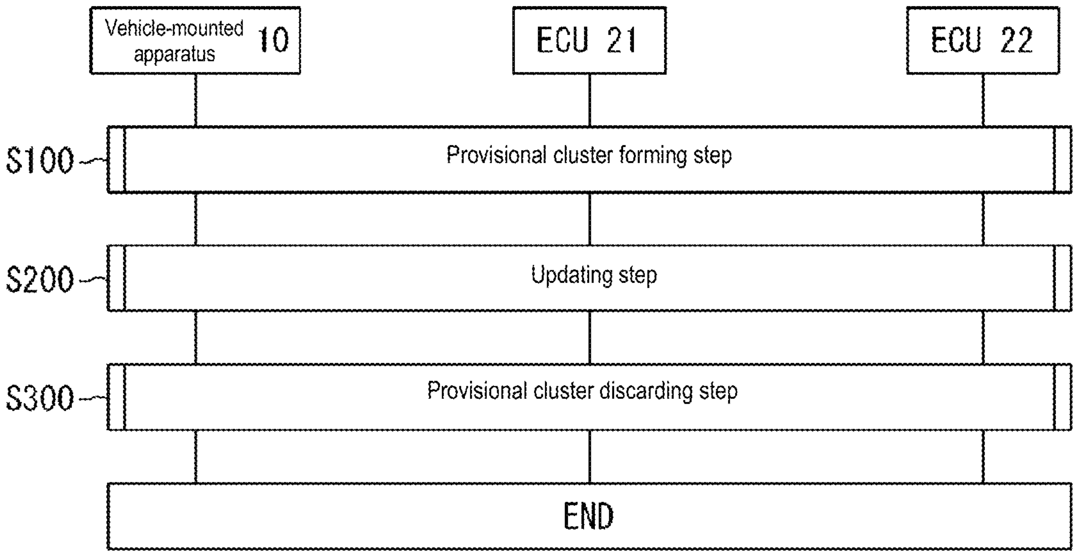
FIG. 7 is a flowchart depicting one example of a control method according to the embodiment.

FIG. 7 is a flowchart depicting one example of a control method executed by the vehicle-mounted system 1. The control executed by the vehicle-mounted apparatus 10 is depicted on the left in FIG. 7, the control executed by the ECU 21 (which is an updated ECU) is depicted in the center of FIG. 7, and the control executed by the ECU 22 (which is a non-updated ECU) is depicted on the right in FIG. 7. The flowcharts from FIG. 8 onwards depict the control executed by the vehicle-mounted apparatus 10, the ECU 21, and the ECU 22 in the same way.

The control executed by the vehicle-mounted apparatus 10 is executed by the microcomputer 11 or the transceivers 15*a* to 15*d*. When the microcomputer 11 executes the control, the control unit 12 reads a computer program from the storage unit 13 (or executes a program written in advance in the control unit 12) and executes various computations and processing.

The control executed by the ECU 21 is executed by the microcomputer 71 or the transceiver 72. When the microcomputer 71 executes the control, the control unit 73 executes various computations and processing by reading a computer program from the storage unit 74 (or in accordance with a program written in advance in the control unit 73).

As depicted in FIG. 7, the vehicle-mounted system 1 executes a provisional cluster forming step (step S100) of forming a provisional cluster including only the updated ECUs 21, 24, and 25 to be updated by the first update data D1, an updating step (step S200) of updating these ECUs 20 belonging to the provisional cluster, and a provisional cluster discarding step (step S300) of discarding the setting of the provisional cluster. Note that the provisional cluster discarding step (step S300) may be omitted.

As one example, the provisional cluster forming step S100 is executed in a state where the ignition switch of the vehicle V1 is turned on. The updating step S200 is executed in a state where the ignition switch of the vehicle V1 is turned off. That is, the update data is provided to the vehicle-mounted apparatus 10 by an OTA or the like while the vehicle V1 is moving. The ECU 20 is thereafter updated using the update data while the vehicle V1 is parked.

Note that the provisional cluster forming step S100 may be executed in a state where the ignition switch of the vehicle V1 is turned off. There are no particular limitations on the state of the vehicle V1 when the provisional cluster discarding step S300 is executed.

Provisional Cluster Forming Step

Figure 8:
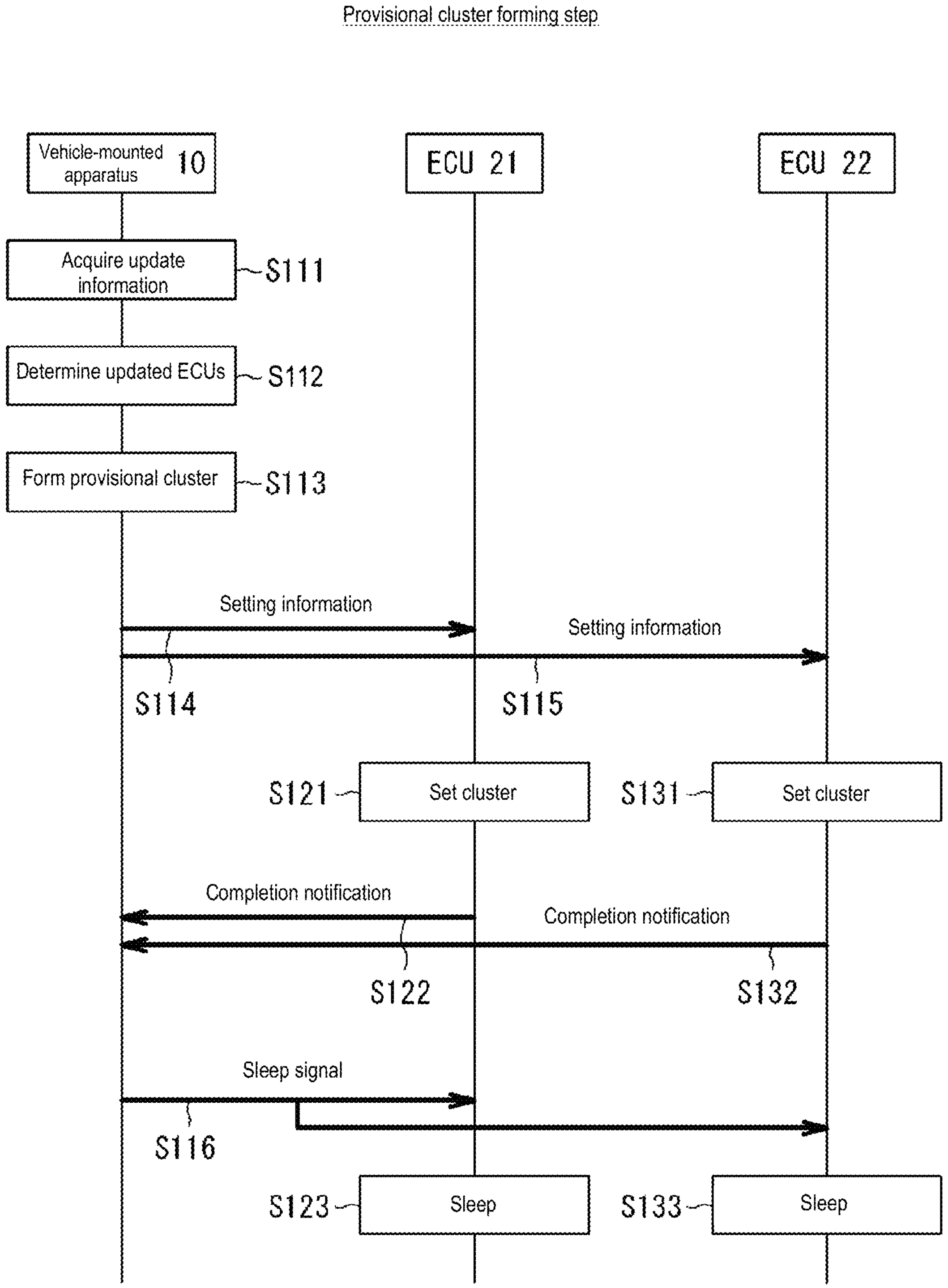
FIG. 8 is a flowchart depicting a provisional cluster forming step in FIG. 7 in detail.

FIG. 8 is a flowchart depicting the provisional cluster forming step S100 in FIG. 7 in detail.

First, the vehicle-mounted apparatus 10 acquires the update information Y1 from outside the vehicle V1 (step S111). As one example, the update information Y1 includes information identifying the cluster targeted by the first update data D1 (as one example, the cluster number of the cluster C1) and information identifying the updated ECUs to be updated by the first update data D1 (as one example, the addresses of the updated ECUs 21, 24, and 25).

As one example, the vehicle-mounted apparatus 10 receives the first update data D1 distributed from the external apparatus 61 via the network and the communication apparatus 50. The vehicle-mounted apparatus 10 then acquires the update information Y1 based on the received first update data D1 (as one example, by analyzing the data content of the first update data D1). Note that the vehicle-mounted apparatus 10 may be provided with the update information Y1 itself before the first update data D1 is provided from outside the vehicle V1.

Next, based on the update information Y1 and the cluster information T1, the vehicle-mounted apparatus 10 determines whether each of the ECUs 21, 22, 24, and 25 belonging to the cluster C1 is an updated ECU that is to be updated by the first update data D1 or is a non-updated ECUs that is not updated by the first update data D1 (step S112).

As one example, the vehicle-mounted apparatus 10 identifies the cluster C1 to be updated out of the plurality of clusters C1 to C8 based on the update information Y1. The vehicle-mounted apparatus 10 then identifies the ECUs 21, 22, 24, and 25 belonging to the cluster C1 out of the ECUs 20 based on the cluster information T1. Finally, based on the update information Y1, the vehicle-mounted apparatus 10 extracts the updated ECUs 21, 24, and 25 to be updated by the first update data D1 out of the ECUs 21, 22, 24, and 25. The remaining ECU 22 that has not been extracted is determined to be a non-updated ECU.

Next, the vehicle-mounted apparatus 10 generates a provisional cluster to which the updated ECUs 21, 24, and 25 belong and to which the non-updated ECU 22 does not belong (step S113). In more detail, the control unit 12 generates cluster information T1*a* including this provisional cluster and stores the cluster information T1*a* in the storage unit 13.

FIG. 9 is a table depicting one example of the cluster information T1*a* which includes a provisional cluster. As depicted in FIG. 9, the control unit 12 uses the cluster C8 as a provisional cluster. In more detail, in the cluster C8, the updated ECUs 21, 24, and 25 are set at "1", and the other ECUs 20, including the nonupdated ECU 22, are set at "0". Since the cluster C8 is an empty cluster to which none of the ECUs 20 belongs before the provisional cluster is set, by setting a cluster C8 like this as a provisional cluster, it is possible to suppress any influence on existing clusters.

Next, the control unit 12 distributes setting information Y2 for setting this provisional cluster to the ECUs 21, 22, 24, and 25 that belong to the cluster C1 (steps S114 and S115). As one example, the control unit 12 transmits cluster information T2*a* to the ECU 21 (step S114) and transmits cluster information T3*a* to the ECU 22 (step S115). The cluster information T2*a* has an 8-bit pattern of "101 . . . 1", and the cluster information T3*a* has an 8-bit pattern of "111 . . . 0".

If an ECU 20 to which the setting information Y2 is to be distributed is in the sleep mode, the control unit 12 temporarily wakes up the destination ECU 20 before distributing the setting information Y2. In more detail, if the ECUs 21, 22, 24, and 25 that belong to the cluster C1 are in the sleep mode, the control unit 12 distributes a control message (the control message depicted in FIG. 6) including the data field F1, which enables the cluster C1, to the plurality of ECUs 20, thereby setting the ECUs 21, 22, 24, and 25 that belong to the cluster C1 into the normal mode, and then distributes the setting information Y2 to the ECUs 21, 22, 24, and 25 in that state.

When the ECU 21 has received the cluster information T2*a* as the setting information Y2, the ECU 21 rewrites the cluster information T2 (which is 101 . . . 0) stored in the register 75 to the cluster information T2*a* (by changing the 8th bit from "0" to "1") and thereby executes a new cluster setting including the provisional cluster (step S121). When the ECU 21 has completed the rewriting of the register 75, the ECU 21 transmits a completion notification to the vehicle-mounted apparatus 10 (step S122).

When the ECU 22 has received the cluster information T3*a* as the setting information Y2, the ECU 22 rewrites the cluster information T3 stored in the register 75 to the cluster information T3*a*, and thereby executes a new cluster setting including the provisional cluster (step S131). When the ECU 22 has completed the rewriting of the register 75, the ECU 22 transmits a completion notification to the vehicle-mounted apparatus 10 (step S132).

Note that at the ECU 22, there is no change in the cluster setting before and after the provisional cluster is set, so that the cluster information T3 and the cluster information T3*a* are the same. In this case, the vehicle-mounted system 1 may omit the execution of steps S115, S131, and S132.

When the control unit 12 has received a completion notification from the ECUs 21, 22, 24, and 25 belonging to the cluster C1 and other sleep conditions are also satisfied, the control unit 12 distributes a sleep signal to put the ECUs 21, 22, 24, and 25 to sleep (step S116). When this sleep signal has been received, the ECUs 21, 22, 24, and 25 switch from the normal mode to the sleep mode (steps S123 and S133). This completes the provisional cluster forming step S100.

Updating Step

Figure 10:
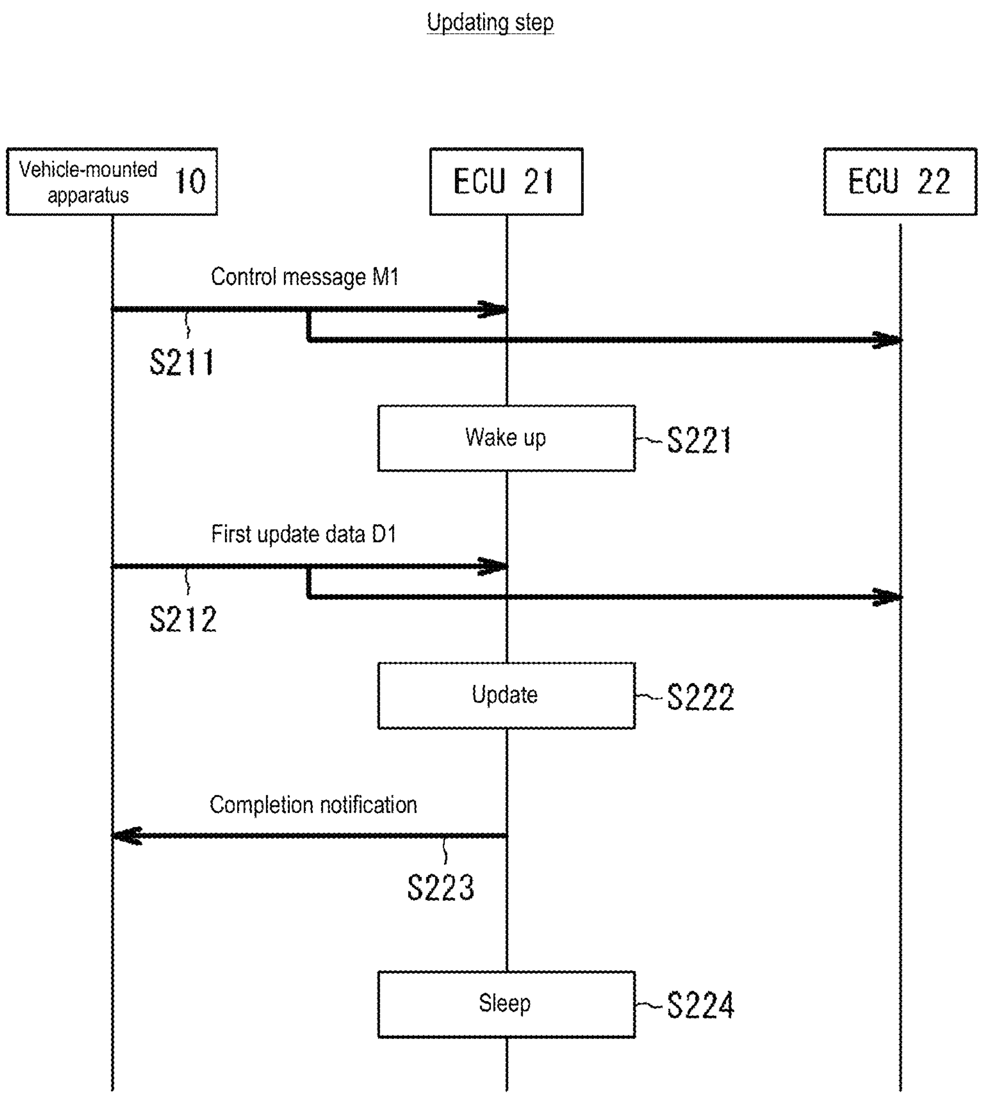
FIG. 10 is a flowchart depicting an updating step in FIG. 7 in detail.

FIG. 10 is a flowchart depicting the updating step S200 in FIG. 7 in detail.

When distributing the first update data D1, the control unit 12 distributes a control message M1 to wake up only the updated ECUs 21, 24, and 25 (step S211). As depicted in FIG. 10, the control unit 12 may distribute the control message M1 before distributing the first update data D1, or may simultaneously transmit the first update data D1 and the control message M1. Alternatively, the first update data D1 may be included in the control message M1.

FIG. 11 depicts one example of the data field F2 in a control message M1.

In the data field F2, the cluster C1, which is the first bit and the target of the first update data D1, is invalid, but the provisional cluster, in the present embodiment, the cluster C8, which is the eighth bit, is valid.

The control message M1 is broadcast from the vehicle-mounted apparatus 10 to the communication bus 30 and is received by each of the plurality of ECUs 20. The transceiver 72 of each ECU 20 determines whether the control message M1 matches the cluster information stored in its own register 75 as described above, and wakes up when there is a match.

Since the ECU 21 belongs to the provisional cluster as a result of the provisional cluster forming step (that is, since the eighth bit of cluster information T2*a* is "1"), the ECU 21 wakes up when the control message M1 is received (step S221). In the same way, the other updated ECUs 24 and 25 also wake up. On the other hand, since the ECU 22 does not belong to the provisional cluster, the ECU 22 does not wake up even when the control message M1 has been received and instead remains in the sleep mode.

The control unit 12 then distributes the first update data D1 to the plurality of ECUs 20 (step S212). Note that if the control message M1 contains the first update data D1 as described above, steps S211 and S212 are executed simultaneously. The first update data D1 is received by the updated ECUs 21, 24, and 25 that have woken up and the updated ECUs 21, 24, and 25 are each updated (step S222). When the updating has been completed, the ECU 21 transmits a completion notification to the vehicle-mounted apparatus 10 (step S223), and then switches from the normal mode to the sleep mode (step S224).

In this way, the updating step S200 is completed. By distributing the control message M1, in which the cluster C1 is disabled and the provisional cluster is enabled, to the plurality of ECUs 20 in this way, it is possible to wake up only the updated ECUs 21, 24, and 25 and keep the nonupdated ECU 22 in the sleep mode, which means that the power consumption required to update the ECUs 20 can be suppressed.

Provisional Cluster Discarding Step

Figure 12:
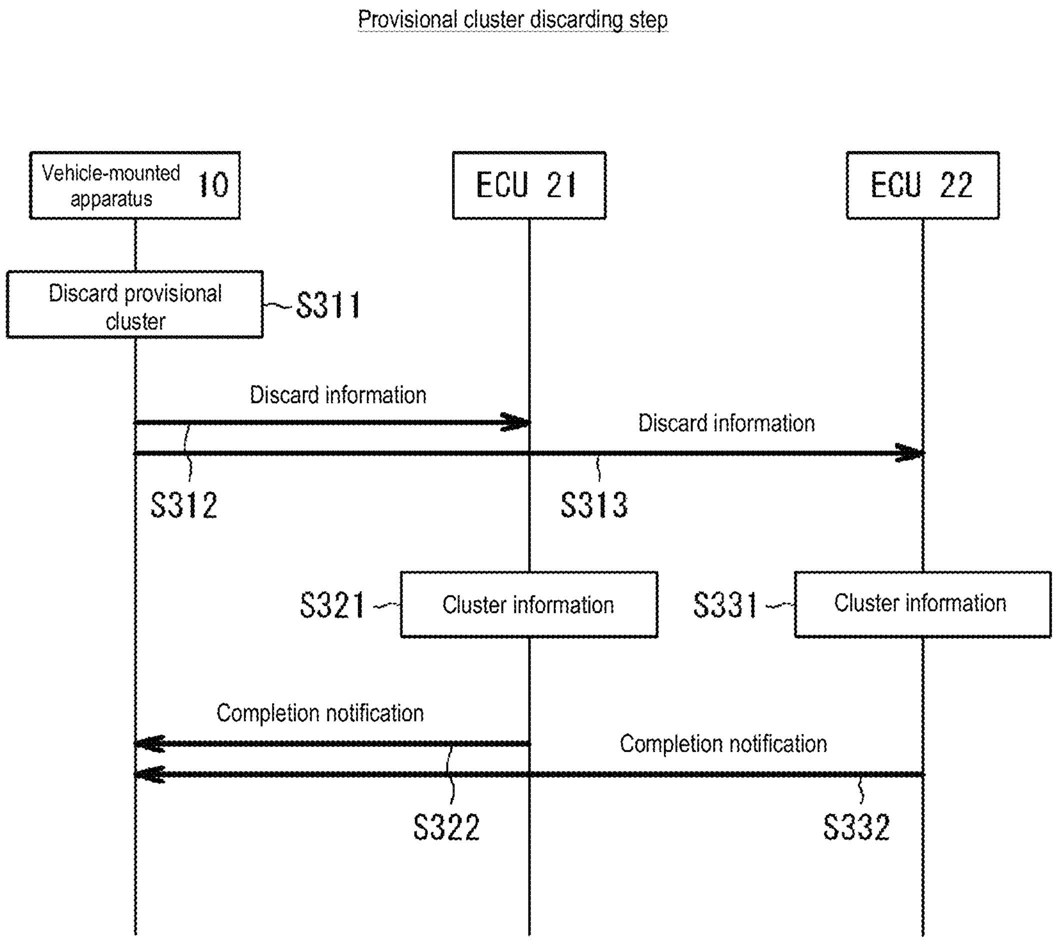
FIG. 12 is a flowchart depicting a provisional cluster discarding step in FIG. 7 in detail.

FIG. 12 is a flowchart depicting the provisional cluster discarding step S300 in FIG. 7 in detail.

Since the number of data fields allocated in a control message to set clusters is finite, there is a limit on the number of clusters that can be set. As one example, since data fields F1 and F2 depicted in FIGS. 6 and 11 are 1 byte long (that is, 8 bits), the upper limit on the number of clusters that can be set is 8. For this reason, after the updating of the ECU 20 is completed, the vehicle-mounted apparatus 10 discards the provisional cluster set in the cluster C8, which makes it possible to set a new provisional cluster in the cluster C8.

After the updating step S200, the control unit 12 discards the setting of the provisional cluster by setting every value in the row of the cluster C8 in the cluster information T1*a* depicted in FIG. 9 at "0" (step S311). By doing so, the cluster information T1*a* becomes the cluster information T1 depicted in FIG. 4. Note that if the ECU 21 has been changed by the first update data D1 so as to newly belong to the cluster C2 for example, this change is maintained as is. In other words, the control unit 12 restores only the values of the provisional cluster in the updated cluster information T1*a* to the state of the cluster information T1.

Next, the control unit 12 distributes discard information Y3 for discarding the setting of the provisional cluster to the ECUs 21, 22, 24, and 25 belonging to the cluster C1 (steps S312 and S313). As examples, the control unit 12 transmits cluster information T2 to the ECU 21 (step S312) and transmits cluster information T3 to the ECU 22 (step S313).

When the ECU 21 has received the cluster information T2 as the discard information Y3, the ECU 21 rewrites the cluster information T2*a* stored in the register 75 to the cluster information T2, thereby executing a new cluster setting that does not include a provisional cluster (step S321). That is, bits in the cluster information T2*a* that correspond to the provisional cluster are changed from "1" to "0". Due to this cluster setting, the ECU 21 no longer belongs to the provisional cluster. When the ECU 21 has completed rewriting the register 75, the ECU 21 transmits a completion notification to the vehicle-mounted apparatus 10 (step S322).

When the ECU 22 has received the cluster information T3 as the discard information Y3, the ECU 22 rewrites the cluster information T3*a* stored in the register 75 to the cluster information T3, thereby executing a new cluster setting that does not include a provisional cluster (step S331). When the ECU 22 has completed the rewriting of the register 75, the ECU 22 transmits a completion notification to the vehicle-mounted apparatus 10 (step S332).

Note that if rewriting of the register 75 at the ECU 22 was not executed in the provisional cluster forming step S100 (that is, if the execution of steps S115, S131, and S132 was omitted), the vehicle-mounted system 1 may omit execution of steps S313, S331, and S332.

This completes the provisional cluster discarding step S300. By discarding the setting of the provisional cluster after the updating step S200, it is possible to dynamically set a provisional cluster out of a limited number of clusters. As one example, if update data for other clusters (for example, clusters C2 and C3) is distributed successively, the flow of step S100, S200, and S300 can be executed consecutively.

Modifications

Modifications of the above embodiment will now be described. In this modification, components that are the same as those in the embodiment described above have been assigned the same reference numerals and description thereof is omitted.

Addition of an ECU

Figure 13:
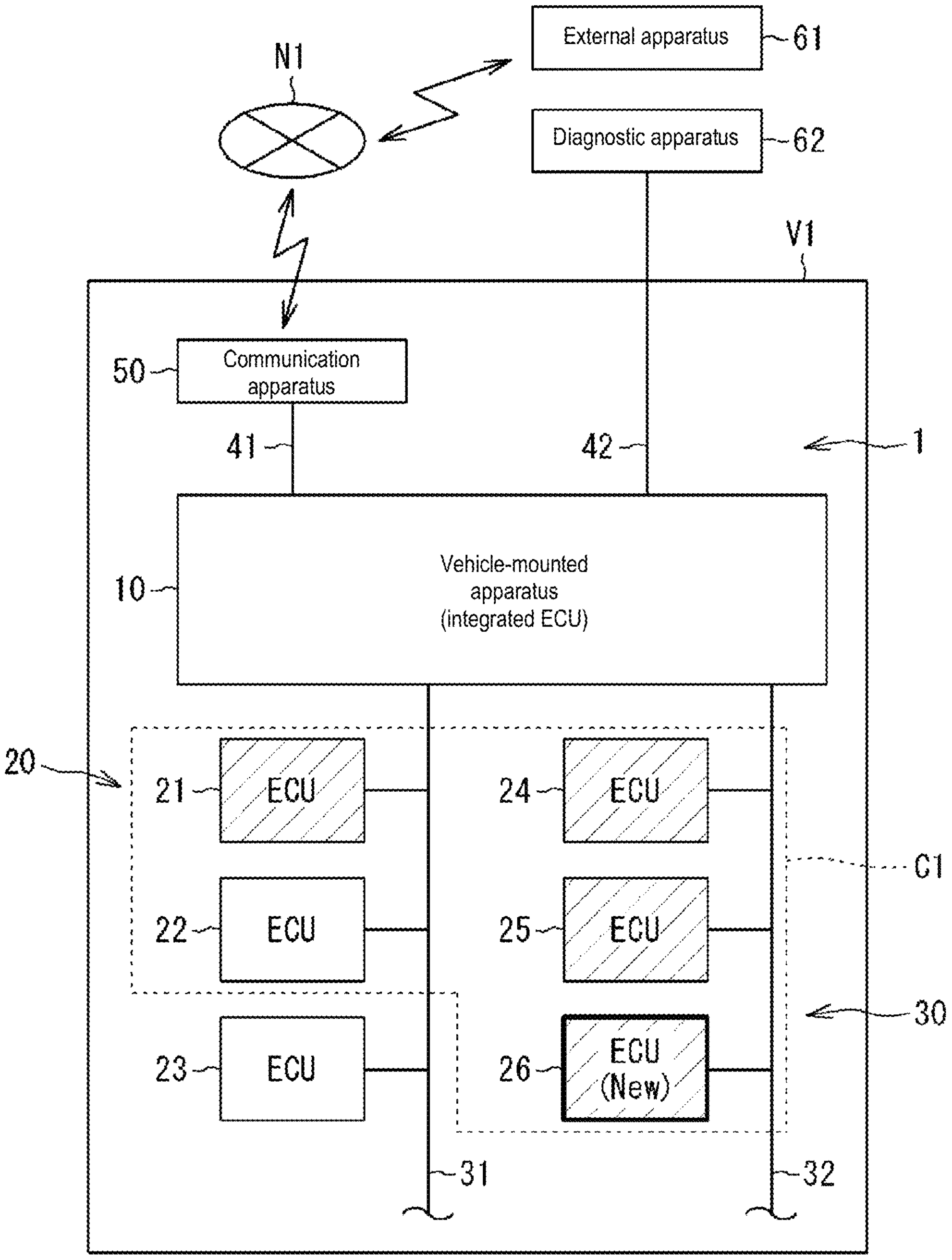
FIG. 13 depicts a vehicle-mounted system according to a modification.

FIG. 13 depicts how one new ECU 20 is added to the vehicle-mounted system 1. This new ECU 20 will be referred to as "ECU 26". The ECU 26 is an ECU that belongs to the cluster C1 after being added.

As one example, consider a case where an ECU 26 is added in a state where the ignition switch of the vehicle V1 is off and all the ECUs 20 belonging to the cluster C1 are in the sleep mode. In this case, as one example, the ECUs 20 belonging to the cluster C1 could be updated in keeping with the addition of ECU 26. However, when updating is executed by the control method according to the present embodiment described above, since the non-updated ECU 22 is kept in the sleep mode in the updating step S200, the non-updated ECU 22 is not able to detect the addition of the ECU 26.

For this reason, when a new ECU 26 is to be added to the cluster C1 prior to the distribution of the first update data D1, the control unit 12 according to this modification acquires addition information Y4, which is information relating to the new ECU 26, before the new ECU 26 is added. The control unit 12 then distributes the addition information Y4 to the plurality of ECUs 20 belonging to the cluster C1 before the distribution of the first update data D1.

By doing so, since information relating to the ECU 26 can be transmitted in advance to the ECUs 20 belonging to the cluster C1 before the first update data D1 is distributed, the non-updated ECU 22 that remains in sleep mode when the first update data D1 is distributed can detect in advance that ECU 26 will be added. By doing so, the reliability of the vehicle-mounted system 1 can be improved.

Figure 14:
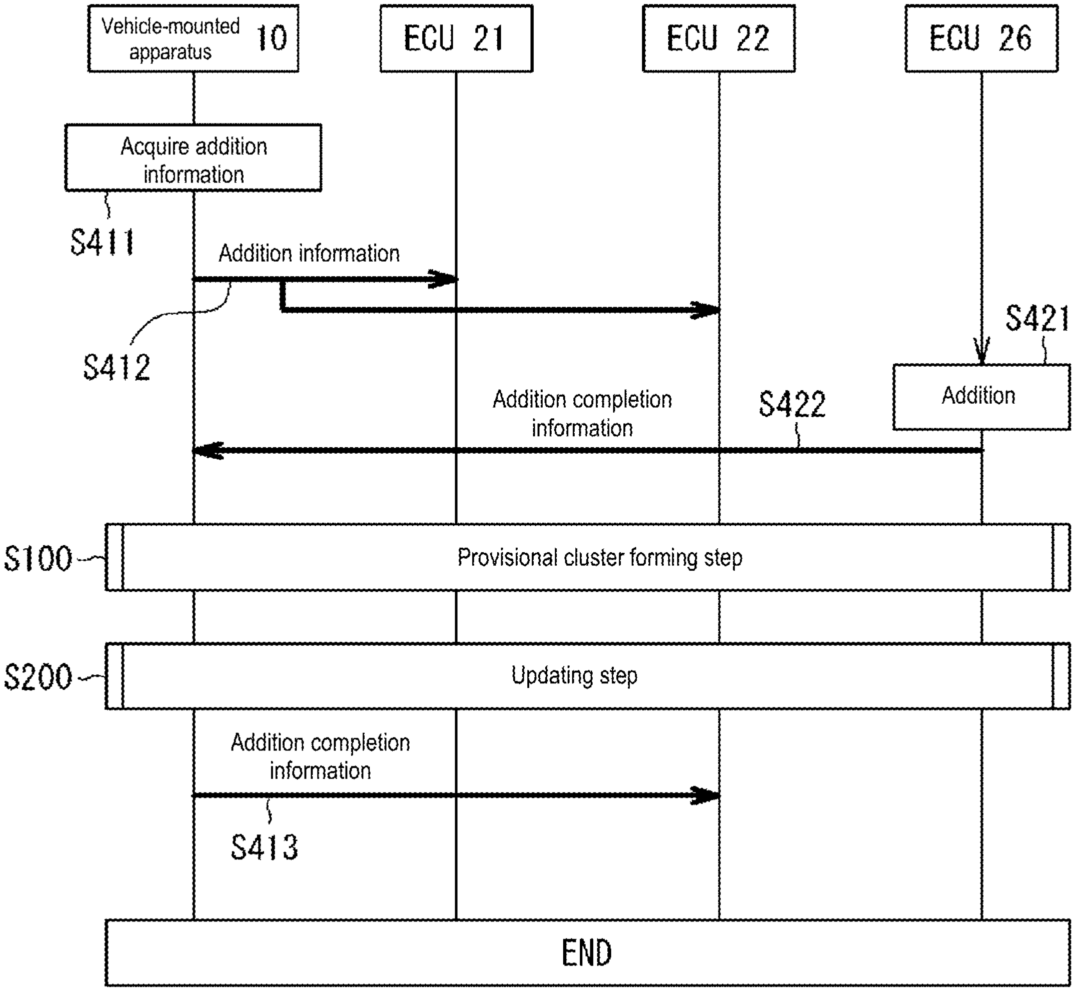
FIG. 14 is a flowchart depicting a control method according to a modification.

FIG. 14 is a flowchart depicting a control method according to this modification. The vehicle-mounted apparatus 10 first acquires the addition information Y4 (step S411). The addition information Y4 is provided to the vehicle-mounted apparatus 10 together with the first update data D1 from, as examples, the external apparatus 61, the diagnostic apparatus 62, or the recording medium 17. As examples, the addition information Y4 includes information for identifying the ECU 26 (as one example, the address of the ECU 26) and information relating to the cluster to which the ECU 26 is to belong as one for example, the cluster number).

Before the ECU 26 is added, the vehicle-mounted apparatus 10 distributes the addition information Y4 to the ECUs 20 belonging to the cluster C1 (that is, the cluster to which the ECU 26 is scheduled to belong) via the communication buses 30 (step S412). As one example, the vehicle-mounted apparatus 10 performs step S412 while the ECUs 20 belonging to the cluster C1 are in the normal mode. In more detail, the vehicle-mounted apparatus 10 distributes the addition information Y4 while the ignition switch of the vehicle V1 is turned on.

The ECUs 20 (including the non-updated ECU 22) belonging to the cluster C1 each store the received addition information Y4 in the storage unit 74. This enables the ECUs 20 that belong to the cluster C1 to detect in advance information relating to the ECU 26 that is scheduled to newly belong to the cluster C1.

Next, the ECU 26 is actually added to the vehicle-mounted system 1 (step S421). As one example, the ECU 26 is connected to the communication bus 32. When such connecting is complete, the ECU 26 transmits an addition completion notification to the vehicle-mounted apparatus 10 (step S422).

After this, the vehicle-mounted system 1 executes the provisional cluster forming step S100 and the updating step S200. The ECU 26 may be an updated ECU that is updated by the first update data D1, or may be a non-updated ECU that is not updated by the first update data D1.

After receiving the addition completion notification in step S422, the vehicle-mounted apparatus 10 transmits an addition completion information Y5, which gives notification that addition of the ECU 26 has been completed, to the ECUs 20 belonging to the cluster C1 when the ECUs belonging to the cluster C1 have woken up (step S413).

The transmission timing of the addition completion information Y5 may differ depending on the timing at which each ECU 20 wakes up. As one example, since the updated ECUs 21, 24, and 25 wake up when setting a provisional cluster in the provisional cluster forming step S100 and/or when performing an update in the updating step S200, the vehicle-mounted apparatus 10 may transmit the addition completion information Y5 to the updated ECUs 21, 24, and 25 at such time.

In the case of the non-updated ECU 22, if a provisional cluster is set in the provisional cluster forming step S100, the non-updated ECU 22 will enter the normal mode at such time, which means that the addition completion information Y5 may be transmitted. However, if the non-updated ECU 22 is not woken up in the provisional cluster forming step S100 (when steps S115, S131, and S132 in FIG. 8 are omitted), the non-updated ECU 22 will remain in the sleep mode. For this reason, the vehicle-mounted apparatus 10 may distribute the addition completion information Y5 to the ECUs 21, 22, 24, and 25 in a state where the ignition switch of the vehicle V1 is turned on and all the ECUs 20 belonging to the cluster C1 have entered the normal mode.

Notification of Update Content to Non-Updated ECU

In the embodiment described above, the non-updated ECU 22 is kept in the sleep mode during the updating step S200. This means that the non-updated ECU 22 cannot know the update content of the updated ECUs 21. As one example, if the update content of the updated ECUs 21 affects the operation of the non-updated ECU 22, it will be preferable for the non-updated ECU 22 to grasp the update content to prevent malfunctions of the vehicle-mounted system 1, even when for example there is no update to the program of the non-updated ECU 22 itself.

Here, when data is transmitted from an ECU 20 connected to the communication bus 31 to an ECU 20 connected to the other communication bus 32, since the data will pass the vehicle-mounted apparatus 10, it would be possible for the vehicle-mounted apparatus 10 to block the transmission of data to the communication bus 32 that appears likely to cause a malfunction at an ECU 20 connected to the communication bus 32. On the other hand, if both the updated ECU 21 and the non-updated ECU 22 are present on the same communication bus 31, data transmitted from the updated ECU 21 to the communication bus 31 will reach the non-updated ECU 22 as it is, which prevents any blocking function of the vehicle-mounted apparatus 10 from working and has a high risk of causing a malfunction in the operation of the non-updated ECU 22.

For this reason, when the updated ECU 21 and the non-updated ECU 22 are present on the same communication bus 31, the control unit 12 according to this modification gathers the update content of the updated ECU 21 by the first update data D1 and stores the gathered content in the storage unit 13. When, after the updated ECU 21 has been updated by the first update data D1, the non-updated ECU 22 (or "first non-updated ECU") connected to the same communication bus 31 as the updated ECU 21 has entered the normal mode, the control unit 12 notifies the non-updated ECU 22 of the update content of the updated ECU 21 due to the first update data D1.

By doing so, it is possible to prevent the update content of the updated ECUs 21 from causing a malfunction in the operation of the non-updated ECU 22.

Provisional Cluster in Conflicted State

In the embodiment described above, a provisional cluster is set in the cluster C8, which is "empty". However, in reality, there may be cases where there is no cluster C8 which is "empty". In this case, it is possible to temporarily set a cluster that is used infrequently or the like as a provisional cluster.

As one example, consider a case where the cluster C3 is temporarily changed to a provisional cluster including only the updated ECUs 21, 24, and 25 that are to be updated by the first update data D1 during a period from the provisional cluster forming step S100 to the provisional cluster discarding step S300.

In this case, before a provisional cluster is set, the ECU 22 switches to the normal mode in response to a control message (hereinafter referred to as the "first control message Mx1") including a data field that enables the cluster C3. On the other hand, since the ECU 22 will no longer belong to the cluster C3 after the provisional cluster has been set, the ECU 22 does not switch to the normal mode in response to the first control message Mx1.

Note that the ECU 22 will switch to the normal mode, both before and after a provisional cluster is set, in response to a control message (hereinafter referred to as the "second control message Mx2") including a data field that enables the cluster C2.

In this case, even if a situation occurs where it is desirable to wake up the ECU 22 using the cluster C3, it will not be possible to wake up the ECU 22 due to the setting of the provisional cluster. As one example, consider a case where the cluster C3 is originally set to include an ECU 20 that operates in response to unlocking of the door locks of the vehicle V1. In more detail, the ECU 21 is an ECU for receiving an unlocking signal from a sensor indicating that the door locks of the vehicle V1 have been unlocked and the ECU 22 is an ECU for controlling actuators for opening the mirrors of the vehicle V1 outward in response to the door locks of the vehicle V1 being unlocked.

At this time, when the ECU 21 has received an unlocking signal, the ECU 21 transmits the first control message Mx1 to the communication bus 31 in an attempt to wake up the ECUs 20, including the ECU 22, which operate in conjunction with the unlocking of the door locks. However, if a provisional cluster has been set in the cluster C3, the ECU 22, which would normally be woken up by the first control message Mx1, will not wake up, which may result in a malfunction, such as the mirrors of the vehicle V1 not opening.

This means that with this modification, if the setting of the provisional cluster conflicts with the original cluster, to suppress malfunctions in the vehicle-mounted system 1, the vehicle-mounted apparatus 10 will wake up the ECU 22, which no longer wakes up due to the first control message Mx1, using a different control message.

Figure 15:
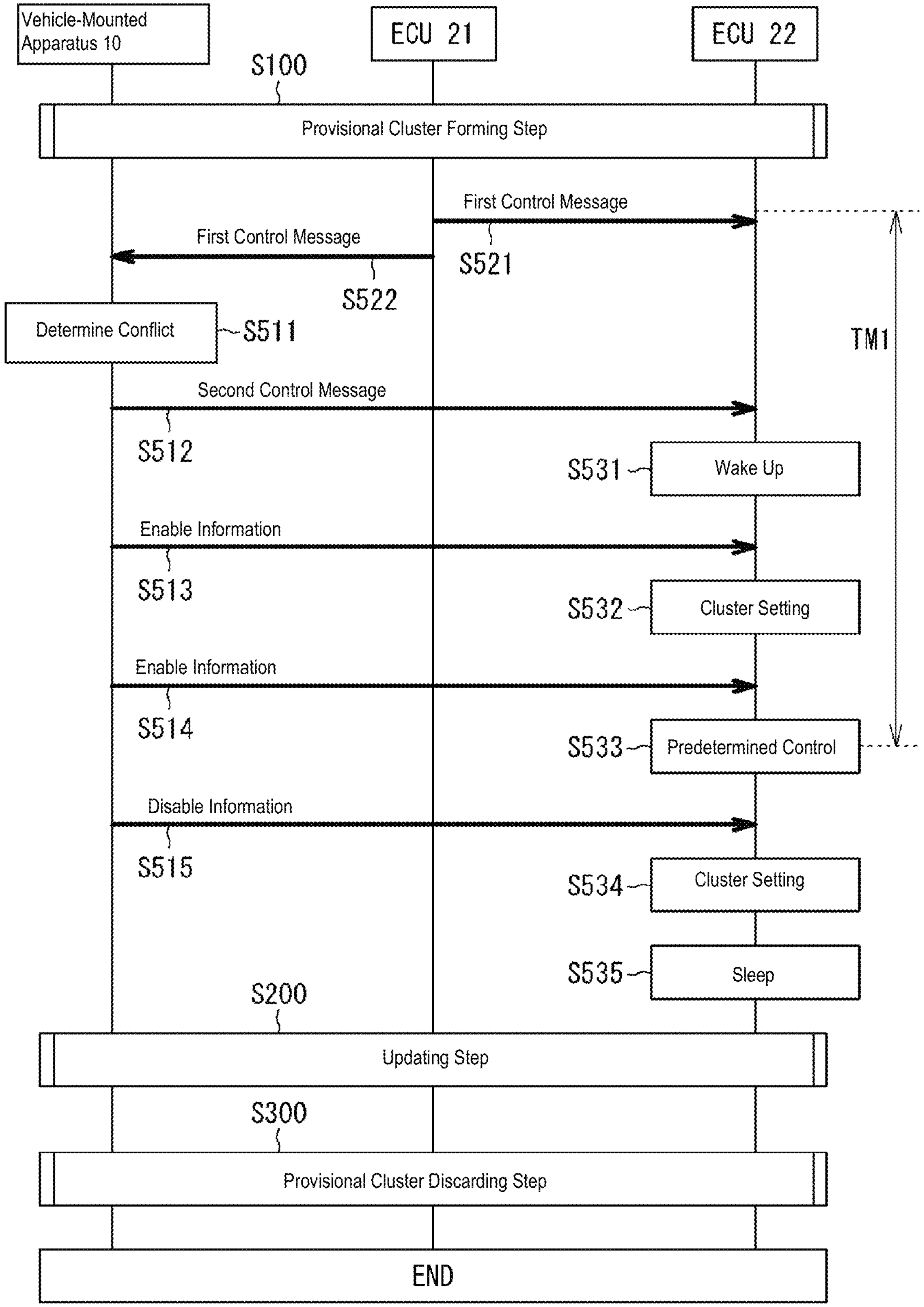
FIG. 15 is a flowchart depicting a control method according to a modification.

FIG. 15 is a flowchart depicting a control method according to this modification.

After the provisional cluster forming step S100 and before the provisional cluster discarding step S300, the ECU 21 transmits the first control message Mx1 to the communication bus 31. The first control message Mx1 is received by the ECU 22 via the communication bus 31 (step S521) and is also received by the vehicle-mounted apparatus 10 (step S522). As described above, after the provisional cluster has been set, the ECU 22 will not wake up even when the first control message Mx1 is received.

As one example, during the provisional cluster forming step S100, the control unit 12 stores information (or "change information"), which relates to the part of the cluster information T1 that is changed from "1" to "0" due to the setting of a provisional cluster, in the storage unit 13. Next, after step S522, the control unit 12 determines whether the provisional cluster that has been enabled in the first control message Mx1 conflicts with an original cluster (step S511).

In more detail, when the control unit 12 has received the first control message Mx1, the control unit 12 determines whether the first control message Mx1 is addressed to an ECU 20 whose cluster information T1 has been changed from "1" to "0" due to the setting of a provisional cluster. In other words, the control unit 12 determines whether the address of the first control message Mx1 is an ECU 20 (or "conflicted ECU") that would have woken up in response to the first control message Mx1 before the setting of the provisional cluster but will no longer wake up in response to the first control message Mx1 due to the setting of the provisional cluster.

If the control unit 12 has determined that the destination of the first control message Mx1 is a conflicted ECU, the control unit 12 transmits a second control message Mx2 to the conflicted ECU (in this example, the ECU 22) (step S512). On receiving the second control message Mx2, the ECU 22 switches from the sleep mode to the normal mode (step S531).

Next, the control unit 12 transmits enable information Y6 to the ECU 22 in a state where the ECU 22 has been placed in the normal mode due to the second control message Mx2 (step S513). Here, the expression "enable information Y6" refers to information for changing the cluster setting of the ECU 22 so that the first control message Mx1 switches the ECU 22 to the normal mode.

As one example, if the cluster information T3 (111 . . . 0) is stored in the register 75 of the ECU 22 before the provisional cluster forming step S100 and cluster information T3*b* (for example, 110 . . . 0) is stored after the provisional cluster forming step S100, the enable information Y6 will be information for changing the third bit, which is the provisional cluster in the cluster information T3*b*, to from "0" to "1", such as cluster information T3*c* (111 . . . 0).

The ECU 22 rewrites the cluster information in the register 75 based on the enable information Y6 to newly set a cluster (step S532). By doing so, the ECU 22 can wake up and perform various control according to a control message that includes a data field in which the provisional cluster (cluster C3) has been enabled.

Next, the vehicle-mounted apparatus 10 transmits the first control message Mx1 to the ECU 22 (step S514). Note that the vehicle-mounted apparatus 10 may instruct the ECU 21 to retransmit the first control message Mx1. In this case, the ECU 21 that has received this instruction transmits the first control message Mx1 to the ECU 22.

The ECU 22 executes predetermined control based on the first control message Mx1 (step S533). As one example, the predetermined control is control that opens the mirrors of the vehicle V1. After execution of this predetermined control, the vehicle-mounted apparatus 10 transmits disable information Y7 to the ECU 22 (step S515) before the execution of the updating step S200.

Here, the expression "disable information Y7" refers to information for changing the cluster setting of the ECU 22 so that the first control message Mx1 does not switch the ECU 22 to the normal mode. As one example, the disable information Y7 is information for restoring a bit that was temporarily changed from "0" to "1" by the enable information Y6, such as the third bit of the cluster information T3*c* (111 . . . 0), back to "0."

The ECU 22 rewrites the cluster information in the register 75 based on the disable information Y7 to newly set a cluster (step S534). As a result, the ECU 22 will not be woken up by a control message including a data field in which the provisional cluster (the cluster C3) is enabled. After this, the ECU 22 switches to the sleep mode (step S535).

As described above, by temporarily changing the cluster setting of the ECU 22 that stopped waking up due to the conflict over the provisional cluster, it becomes possible to execute predetermined control at the ECU 22. By doing so, it is possible to suppress the occurrence of malfunctions in the vehicle-mounted system 1, even in cases where the number of clusters is limited and a provisional cluster is set at a cluster that is already in use.

In addition, by restoring the cluster setting of the ECU 22 to its original state after predetermined control at the ECU 22, the ECU 22 can be kept in the sleep mode during the updating step S200, which makes it possible to reduce the power consumption in the vehicle-mounted system 1 during updating.

Conflict Avoidance for Provisional Clusters

According to the control method depicted in FIG. 15, it is possible to operate the ECU 22 even when conflict occurs over a provisional cluster. However, in the example in FIG. 15, a required period TM1 is taken from when the ECU 21 transmits the first control message Mx1 to the ECU 22 until the predetermined control is performed. If no provisional cluster were set in the cluster C3, the predetermined control would be executed immediately after the ECU 21 transmits the first control message Mx1 to the ECU 22 (that is, without passing through steps S511, S512, S531, S513, S532, and S514 in FIG. 15), which means that the ECU 22 can respond faster when there is no conflict due to a provisional cluster. For this reason, it is preferable to not set a provisional cluster at a cluster where faster control is required.

As examples, control messages include real-time messages that require real-time control, and non-real-time messages that require control but with lower immediacy than real-time messages. As one example, a real-time message is a control message where a permitted period from transmission by the ECU 21 of a control message addressed to the ECU 22 until the execution of processing based on such control message by the ECU 22 is less than a first threshold value Th1.

One example of control executed by a real-time message is control to unlock the doors of the vehicle V1. Control that unlocks the doors requires real-time control because making the user of the vehicle V1 wait a long time for the doors to unlock is likely to frustrate the user. Another example of control executed by a real-time message may be control that drives a seat motor of the vehicle V1. Such control requires real-time control because any delay is highly likely to feel strange to the user.

Further examples of control executed in response to real-time messages may be control to turn on the headlights of the vehicle V1, control to turn on hazard lights of the vehicle V1, or control to operate the wipers of the vehicle V1. Since such control is related to the safety of the vehicle V1, real-time control is required.

As more examples, control executed by a real-time message may be security-related control (such as detection of broken glass and activation of an anti-theft alarm) or illumination control. Real-time control is required for security control since any delay may increase the risk of the vehicle V1 being stolen. Real-time control is also required for blinking of the lights of the vehicle V1 since any loss of synchronization may appear strange to people who can see the lights.

One example of non-real-time message is a control message where the permitted period from transmission by the ECU 21 of a control message addressed to the ECU 22 until execution of processing based on the control message by the ECU 22 is equal to or longer than the first threshold value Th1.

One example of the control executed by a non-real-time message is control that opens the mirrors when the doors of the vehicle V1 are unlocked. After the doors of the vehicle V1 are unlocked, a certain amount of time will be taken before vehicle V1 starts moving due to the user fastening his/her seat belt and the like. Even if there is a delay before the mirrors open, this is unlikely to frustrate the user.

The ECUs 20 that transmit and receive real-time messages are set in advance out of the plurality of ECUs 20, with the storage unit 13 storing information relating to these ECUs 20 that transmit and receive real-time messages. When setting a provisional cluster, the control unit 12 does not set a provisional cluster at a cluster in which an ECU 20 that transmits and receives real-time messages is set at "1". As a result, the first control message described above can correspond only to messages that are non-real-time messages. This makes it possible to suppress delays in control that has a short permitted period.

Appendix

Note that the embodiment described above and the various modifications can be freely combined at least in part. The embodiments and modifications disclosed above are exemplary in all respects and should not be regarded as limitations on the present disclosure. The scope of the present disclosure is indicated by the range of the patent claims, not the description given above, and is intended to include all changes within the meaning and scope of the patent claims and their equivalents.

The invention claimed is:

1. A vehicle-mounted apparatus that distributes update data, which is provided from outside a vehicle, to a plurality of ECUs that are connected via a communication bus, wherein:

each of the plurality of ECUs belongs to at least one cluster out of a plurality of clusters, when a cluster to which an ECU belongs is disabled in a control message that is received by the ECU from the communication bus, the ECU enters a sleep mode in which functions are more limited than in a normal mode to suppress power consumption, and when the cluster to which the ECU belongs is enabled in the control message, the ECU enters the normal mode, the vehicle-mounted apparatus comprising:

a storage unit configured to store cluster information linking each of the plurality of ECUs to an assigned cluster among the plurality of clusters; and a control unit configured to:

determine whether each ECU belonging to a first cluster of the plurality of clusters is a to-be-updated ECU or is a non-updated ECU based on the cluster information and first update data or on update information provided from outside the vehicle, wherein the first update data is update data for the first cluster, distribute, prior to and separately from distribution of the first update data, a setting information to the plurality of ECUs belonging to the first cluster, wherein the setting information sets a provisional cluster of ECUs belonging to the first cluster, wherein the provisional cluster includes the to-be-updated ECUs and does not include the non-updated ECUs, and distribute the control message to the plurality of ECUs and the first update data, wherein the distributed control message enables the to-be updated ECUs of the provisional cluster and disables the non-updated ECUs of the first cluster such that only the to-be-updated ECUs in the provisional cluster wake to receive the first update data while the non-updated ECUs are in the sleep mode and do not update.

2. The vehicle-mounted apparatus according to claim 1, wherein before distribution of the first update data, the control unit distributes discard information for discarding a setting of the provisional cluster to the plurality of ECUs belonging to the first cluster.

3. The vehicle-mounted apparatus according to claim 1, wherein when a new ECU belonging to the first cluster is to be added to the communication bus before distribution of the first update data, the control unit acquires addition information, which is information relating to the new ECU, before the new ECU is added, and the control unit distributes, before distribution of the first update data, the addition information to the plurality of ECUs belonging to the first cluster.

4. The vehicle-mounted apparatus according to claim 1, wherein the control unit distributes the setting information to the plurality of ECUs belonging to the first cluster in a state where the plurality of ECUs belonging to the first cluster have been set in the normal mode by the control message that enables the first cluster.

5. The vehicle-mounted apparatus according to claim 4, wherein after the to-be-updated ECUs of the provisional cluster have been updated by the first update data and when a first non-updated ECU among the non-updated ECUs of the first cluster has entered the normal mode, the control unit is configured to notify the first nonupdated ECU of an update content of the ECUs of the provisional cluster by the first update data.

6. The vehicle-mounted apparatus according to claim 1, wherein the plurality of ECUs include a conflicted ECU which is switched to the normal mode by a first control message before the provisional cluster is set, and is switched to the normal mode by a second control message that differs to the first control message without being switched to the normal mode by the first control message after the provisional cluster is set, and the control unit transmits, when the control unit has received the first control message that is addressed to the conflicted ECU after the provisional cluster is set, the second control message to the conflicted ECU, transmits, in a state where the conflicted ECU has been set in the normal mode by the second control message, enable information, which makes a setting to enable the first control message to switch the conflicted ECU to the normal mode, to the conflicted ECU, and transmits the first control message to the conflicted ECU after transmitting the enable information.

7. The vehicle-mounted apparatus according to claim 6, wherein after transmitting the enable information and the first control message to the conflicted ECU, the control unit transmits, to the conflicted ECU, disable information, which makes a setting to prevent the conflicted ECU from being switched to the normal mode by the first control message.

8. The vehicle-mounted apparatus according to claim 6, wherein the control message includes:

a real-time message where a permitted period from reception of the control message by the control unit to execution of control based on the control message at the conflicted ECU is less than a first threshold; and a non-real-time message where the permitted period is equal to or greater than the first threshold, and the first control message is a non-real-time message.

9. A vehicle-mounted system comprising: the vehicle-mounted apparatus according to claim 1; and the plurality of ECUs that are connected to the vehicle-mounted apparatus via the communication bus.

10. A control method for controlling a vehicle-mounted apparatus that distributes update data, which is provided from outside a vehicle, to a plurality of ECUs that are connected via a communication bus, wherein:

each of the plurality of ECUs belongs to at least one cluster out of a plurality of clusters, when a cluster to which an ECU belongs is disabled in a control message that is received by the ECU from the communication bus, the ECU enters a sleep mode in which functions are more limited than in a normal mode to suppress power consumption, and when the cluster to which the ECU belongs is enabled, the ECU enters the normal mode, the control method comprises:

storing cluster information linking each of the plurality of ECUs to an assigned cluster among the plurality of clusters;

determining whether each ECU belonging to a first cluster of the plurality of clusters is a to-be-updated ECU or is a non-updated ECU based on the cluster information and first update data or on update information provided from outside the vehicle, wherein the first update data is update data for the first cluster;

distributing, prior to and separately from distribution of the first update data a setting information for setting a provisional cluster of ECUs belonging to the first cluster, wherein the provisional cluster includes the to-be updated ECUs and does not include the non-updated ECUs; and distributing the control message to the plurality of ECUs and the first update data, wherein the distributed control message enables the to-be updated ECUs of the provisional cluster and disables the non-updated ECUs of the first cluster such that only the to-be-updated ECUs in the provisional cluster wake to receive the first update data while the non-updated ECUs are in the sleep mode and do not update.

11. A non-transitory computer readable medium comprising programming instructions for a control program that controls a vehicle-mounted apparatus that distributes update data to a plurality of ECUs which are connected via a communication bus, wherein:

each of the plurality of ECUs belongs to at least one cluster out of a plurality of clusters, when a cluster to which an ECU belongs is disabled in a control message that is received by the ECU from the communication bus, the ECU enters a sleep mode in which functions are more limited than in a normal mode to suppress power consumption, and when the cluster to which the ECU belongs is enabled in the control message, the ECU enters the normal mode, when executed by a computer, the programming instructions cause the computer to:

store cluster information linking each of the plurality of ECUs to an assigned cluster among the plurality of clusters;

determine whether each ECU belonging to a first cluster of the plurality of clusters is a to-be-updated ECU or is a non-updated ECU based on the cluster information and first update data or on update information provided from outside the vehicle, wherein the first update data is update data for the first cluster;

distribute, prior to and separately from distribution of the first update data a setting information to the plurality of ECUs belonging to the first cluster, wherein the setting information sets a provisional cluster of ECUs belonging to the first cluster, wherein the provisional cluster includes the to-be updated ECUs and does not include the non-updated ECUs; and distribute the control message to the plurality of ECUs and the first update data, wherein the distributed control message enables the to-be updated ECUs of the provisional cluster and disables the non-updated ECUs of the first cluster such that only the to-be-updated ECUs in the provisional cluster wake to receive the first update data while the non-updated ECUs are in the sleep mode and do not update.

12. The vehicle-mounted apparatus according to claim 7, wherein the control message includes:

a real-time message where a permitted period from reception of the control message by the control unit to execution of control based on the control message at the conflicted ECU is less than a first threshold; and a non-real-time message where the permitted period is equal to or greater than the first threshold, and the first control message is a non-real-time message.

* * * * *